(12) United States Patent
Jin et al.

(10) Patent No.: US 11,398,776 B2
(45) Date of Patent: Jul. 26, 2022

(54) POWER CONVERSION DEVICE

(71) Applicant: Delta Electronics, Inc., Taoyuan (TW)

(72) Inventors: Da Jin, Shanghai (CN); Dehuan Qi, Shanghai (CN); Peng Xu, Shanghai (CN)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/187,326

(22) Filed: Feb. 26, 2021

(65) Prior Publication Data
US 2021/0305892 A1 Sep. 30, 2021

(30) Foreign Application Priority Data

Mar. 30, 2020 (CN) .......................... 202010234598.6

(51) Int. Cl.
| | | |
|---|---|---|
| *H02M 3/00* | (2006.01) | |
| *H02M 3/158* | (2006.01) | |
| *H02M 1/40* | (2007.01) | |
| *H02M 1/00* | (2006.01) | |
| *H02M 1/44* | (2007.01) | |
| *H02M 7/5395* | (2006.01) | |
| *H02M 7/00* | (2006.01) | |
| *H02M 3/07* | (2006.01) | |

(52) U.S. Cl.
CPC ......... *H02M 3/003* (2021.05); *H02M 1/0064* (2021.05); *H02M 1/40* (2013.01); *H02M 3/1586* (2021.05); *H02M 1/44* (2013.01); *H02M 3/07* (2013.01); *H02M 7/003* (2013.01); *H02M 7/5395* (2013.01)

(58) Field of Classification Search
CPC ........ H02M 1/0064; H02M 1/40; H02M 1/44; H02M 3/003; H02M 3/07; H02M 3/1586; H02M 7/003; H02M 7/5395
See application file for complete search history.

(56) References Cited

U.S. PATENT DOCUMENTS

2018/0323702 A1* 11/2018 Zhou .......................... H01F 3/14

FOREIGN PATENT DOCUMENTS

| CN | 103700473 B | 4/2014 |
|---|---|---|
| CN | 104022632 B | 9/2014 |
| CN | 104092367 A | 10/2014 |
| CN | 105356744 A | 2/2016 |

(Continued)

*Primary Examiner* — Jue Zhang
(74) *Attorney, Agent, or Firm* — Hsuanyeh Law Group PC

(57) ABSTRACT

A power conversion device is provided. The power conversion device includes N power conversion circuits and M magnetic components, where N and M are positive integers greater than 1. Each of the N power conversion circuits includes M inductors. DC currents flowing through the M inductors respectively are unequal. Each one of the M inductors in different ones of the N power conversion circuits corresponds to each other to form a group of N corresponding inductors. In the N power conversion circuits, DC currents respectively flowing through the corresponding inductors are equal. Each of the M magnetic components includes a middle pillar, N side pillars and two substrates. The middle pillar has an air gap. In the N power conversion circuits, windings of N corresponding inductors are respectively wound around the N side pillars of one of the M magnetic components.

21 Claims, 8 Drawing Sheets

(56) References Cited

FOREIGN PATENT DOCUMENTS

| | | |
|---|---|---|
| CN | 105763060 A | 7/2016 |
| CN | 106936306 B | 7/2017 |
| CN | 107017776 A | 8/2017 |
| CN | 107623436 A | 1/2018 |
| CN | 109314462 A | 2/2019 |
| CN | 109995229 A | 7/2019 |
| CN | 110445365 A | 11/2019 |
| CN | 209805666 U | 12/2019 |
| DE | 4401609 C1 | 12/1994 |

* cited by examiner

POWER CONVERSION DEVICE

RELATED APPLICATION

This application claims priority to China Patent Application No. 202010234598.6, filed on Mar. 30, 2020. The entire contents of the above-mentioned patent application are incorporated herein by reference for all purposes.

TECHNICAL FIELD

The present disclosure relates to a power conversion device. More particularly, the present disclosure relates to a power conversion device capable of counteracting the DC magnetic fluxes generated by the windings of inductors.

BACKGROUND

In conventional non-isolated step-down applications with large current, a multi-phase asymmetric buck circuit topology is used to improve the power conversion efficiency. Specifically, in each phase of the asymmetric buck circuit, the windings of plural inductors are wound around the side pillars of the same magnetic component. Accordingly, the AC magnetic fluxes on the middle pillar of the magnetic component can be counteracted with each other, thereby reducing the ripple of the output current. However, if the DC currents flowing through the plural inductors are unequal, the DC magnetic fluxes on the side pillars would be large, which makes the magnetic core easy to be saturated.

Therefore, there is a need of providing a power conversion device to obviate the drawbacks encountered from the prior arts.

SUMMARY

It is an objective of the present disclosure to provide a power conversion device. In a plurality of power conversion circuits, the DC currents flowing through the corresponding inductors which are corresponding to each other are equal. The windings of these corresponding inductors are wound around the side pillars of the same magnetic component, thus the DC magnetic fluxes on the side pillars can be counteracted by each other without disposing an air gap on the side pillars. Consequently, the loss of the power conversion device is reduced, and the magnetic core is prevented from being saturated easily.

In accordance with an aspect of the present disclosure, there is provided a power conversion device. The power conversion device includes an input port, an output port, N power conversion circuits and M magnetic components, where N and M are positive integers greater than 1. The N power conversion circuits are electrically connected between the input and output ports in parallel. Each of the N power conversion circuits includes M inductors. DC currents flowing through the M inductors respectively are unequal. The M inductors include at least one corresponding inductor. In the N power conversion circuits, DC currents flowing through the corresponding inductors which are corresponding to each other are equal. Each of the M magnetic components includes a middle pillar, N side pillars and two substrates. The middle pillar and the N side pillars are located between the two substrates. The middle pillar has an air gap. In the N power conversion circuits, windings of N corresponding inductors which are corresponding to each other are wound around the N side pillars of one of the M magnetic components.

DETAILED DESCRIPTION

The present disclosure will now be described in more detail with reference to the accompanying drawings. It is to be noted that the following descriptions are presented herein for illustrative purposes only. It is not intended to be exhaustive or to be limited to the precise form disclosed.

Figure 1:
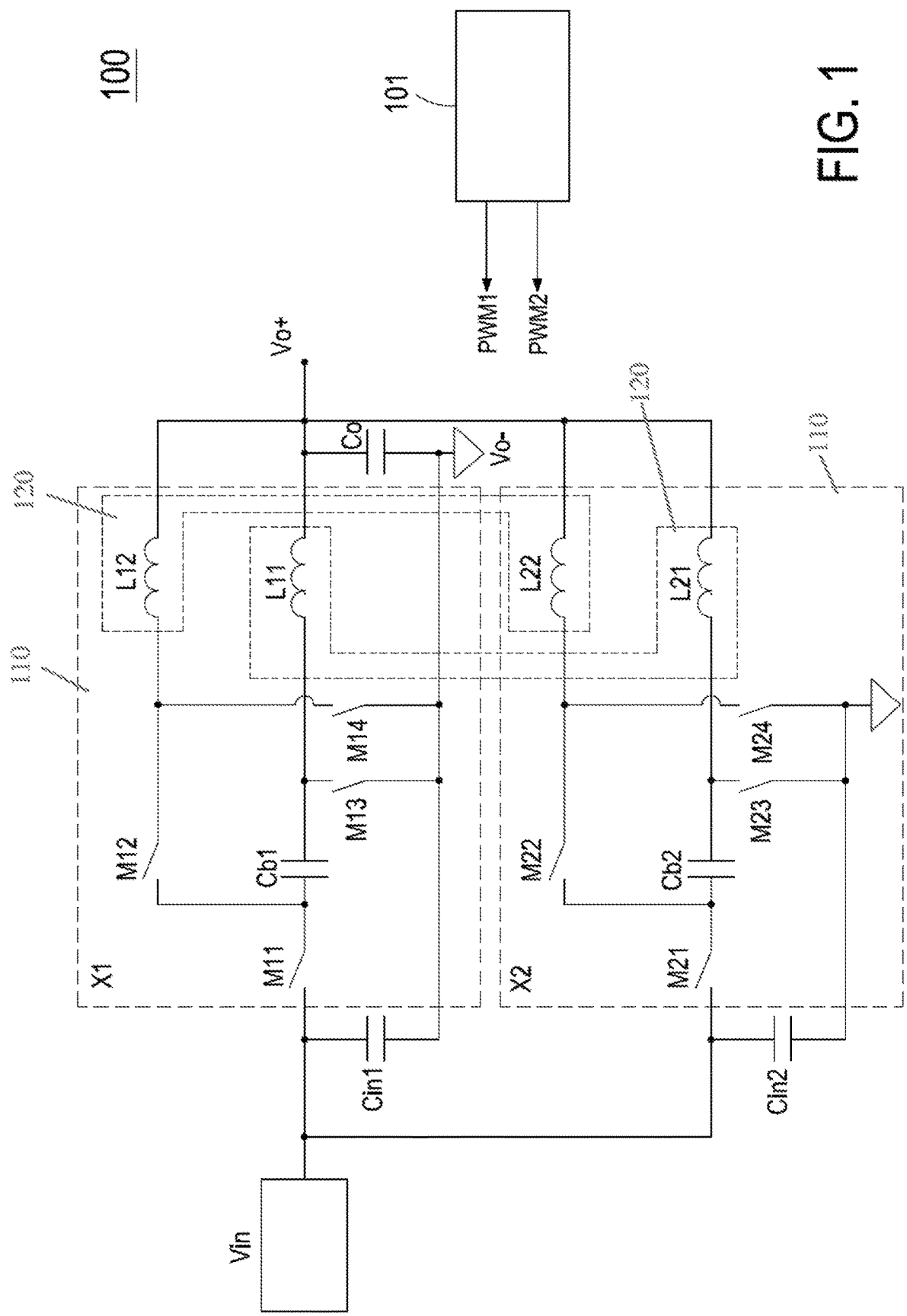
FIG. 1 is a schematic circuit diagram illustrating a power conversion device according to a first embodiment of the present disclosure.
Figure 2A:
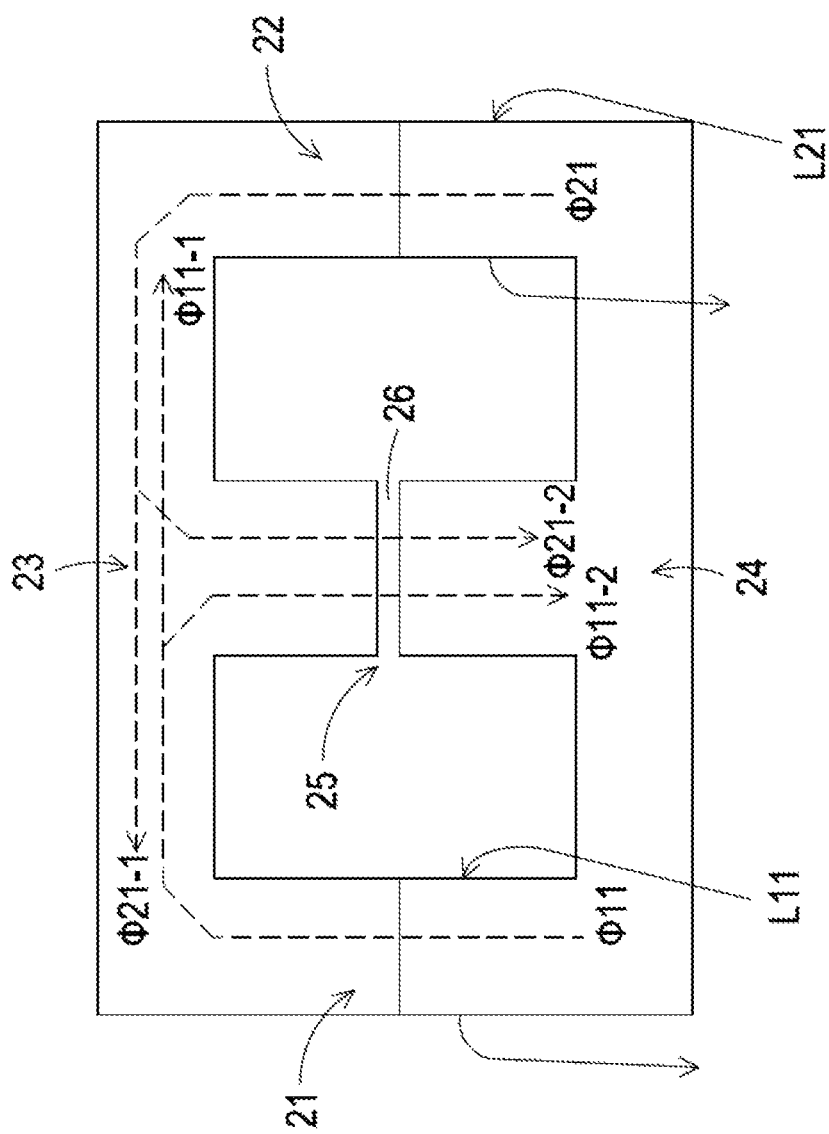
FIG. 2A and FIG. 2B are schematic views showing the structure of a magnetic component in the first embodiment of the present disclosure.
Figure 2B:
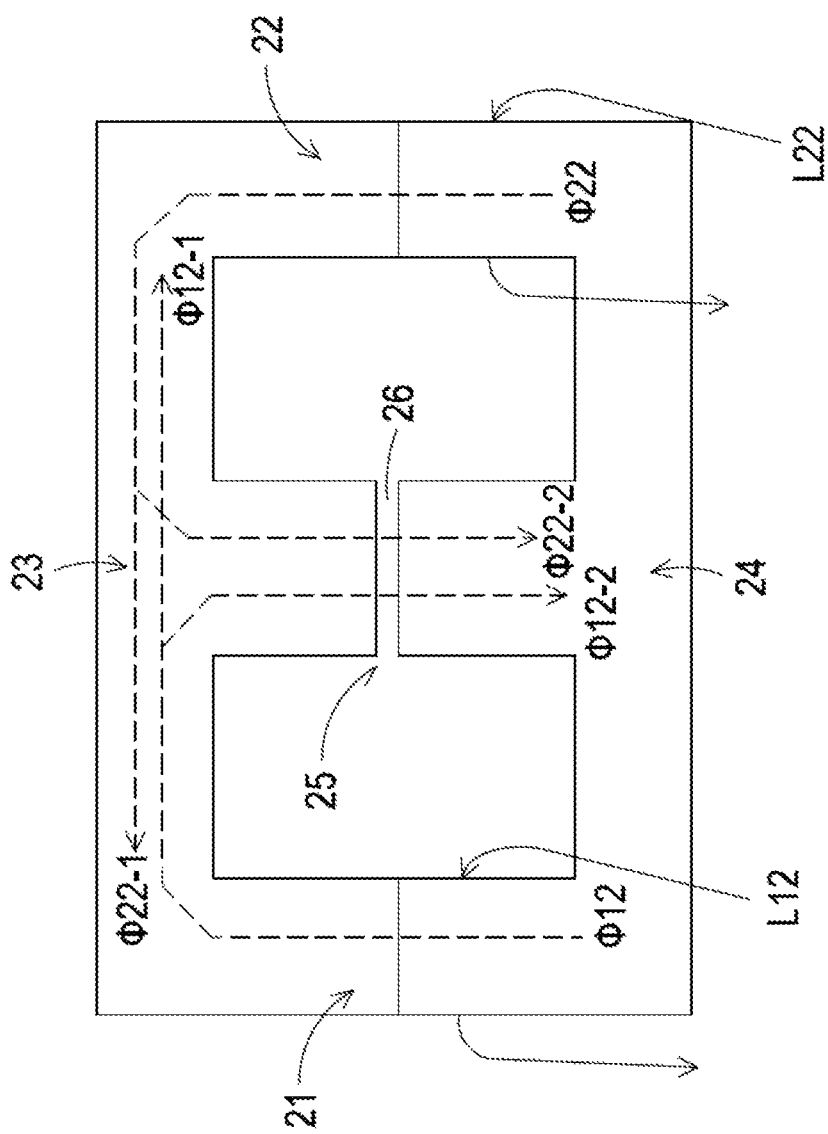

FIG. 1 is a schematic circuit diagram illustrating a power conversion device 100 according to a first embodiment of the present disclosure. FIG. 2A and FIG. 2B are schematic views showing the structure of a magnetic component 120 in the first embodiment of the present disclosure. As shown in FIGS. 1, 2A, and 2B, the power conversion device 100 of the present disclosure includes an input port Vin, an output port Vo, N power conversion circuits 110 and M magnetic components 120, where both N and M are positive integers greater than 1.

The N power conversion circuits 110 are connected to each other in parallel and are electrically connected between the input port Vin and the output port Vo. Each of the N power conversion circuits 110 includes M inductors, and the currents flowing through the M inductors respectively are unequal. The M inductors in one of the N power conversion circuits 110 can correspond to at least one inductor in another one of the N power conversion circuits 110. In the N power conversion circuits 110, the currents flowing through the corresponding inductors which are corresponding to each other are equal.

As shown in FIGS. 2A and 2B, each of the M magnetic components 120 includes a middle pillar 25, N side pillars 21, 22 (here, N=2), and two substrates 23, 24. The middle pillar 25 and the N side pillars 21, 22 are located between the two substrates 23, 24. The middle pillar has an air gap 26 that makes the equivalent reluctance of the middle pillar larger. In the N power conversion circuits 110, the windings of the N corresponding inductors which are corresponding to each other are wound around the N side pillars 21, 22 of the same magnetic component with the same winding direction. Consequently, with regard to each of the N side pillars 21, 22 of the magnetic component, the DC magnetic fluxes flowing therethrough are counteracted by each other. Moreover, the DC magnetic fluxes are superimposed on the middle pillar 25, thereby preventing the magnetic core of the magnetic component from being saturated easily. Further, since the air gap 26 only exist on the middle pillar 25, the inductance of the corresponding inductor can be increased, and the output current ripple and loss of the power conversion device 100 are reduced. In addition, in an embodiment, the voltage signals on the N corresponding inductors wound around the same magnetic component are out of phase with respect to each other in sequence by an angle between (360/N+30) degrees and (360/N+30) degrees. Therefore, the AC magnetic fluxes on the middle pillar 25 of the magnetic component can be counteracted by each other.

In order to control the switches of the power conversion circuit 110, the power conversion device 100 further includes a controller 101. The controller output N control signals that are configured to control the N power conversion circuits 110 respectively. The N control signals have the same duty ratio. The N control signals may be at the same phase. Alternatively, the N control signals may be output of phase with respect to each other in sequence by an angle between (360/N−30) degrees and (360/N+30) degrees.

In an embodiment, each power conversion circuit includes M power conversion units, and each of the M power conversion units includes an inductor, a first switch and a second switch serially connected to the first switch. The first switch of the first power conversion unit is connected to the input port Vin, and the first switch of other power conversion unit is connected to the first switch of the preceding power conversion unit in sequence. In an embodiment, the N control signals control the first switches of the first power conversion units of the N power conversion circuit respectively. In each power conversion circuit, the control signals of the M first switches of the M power conversion units have the same duty ratio and are 360/M degrees out of phase with respect to each other. Moreover, in each power conversion unit, the control signals of the first and second switches are complementary to each other.

In accordance with the first embodiment shown in FIG. 1, FIG. 2A and FIG. 2B, the actual implementation with N equal to 2 and M equal to 2 is exemplified as follows.

In the first embodiment shown in FIG. 1, the power conversion device 100 includes two power conversion circuits X1 and X2. In this embodiment, the power conversion circuit X1 is connected to the input capacitor Cin1 in parallel, and the power conversion circuit X2 is connected to the input capacitor Cin2 in parallel, but not exclusively. In another embodiment, the power conversion circuits X1 and X2 may be connected to the same input capacitor in parallel. The output port Vo of the power conversion device 100 is formed by connecting the output capacitor Co to the output terminals of the power conversion circuits X1 and X2 in parallel. The power conversion circuit X1 includes two power conversion units. The first power conversion unit includes a first switch M11, a second switch M13 and an inductor L11, and the second power conversion unit includes a first switch M12, a second switch M14 and an inductor L12. The power conversion circuit X2 includes two power conversion units. The first power conversion unit of the power conversion circuit X2 includes a first switch M21, a second switch M23 and an inductor L21, and the second power conversion unit of the power conversion circuit X2 includes a first switch M22, a second switch M24 and an inductor L22.

The controller 101 outputs two control signals PWM1 and PWM2 to control the two power conversion circuits X1 and X2, respectively. The control signals PWM1 and PWM2 have the same duty ratio. The control signals PWM1 and PWM2 may be at the same phase, or the control signals PWM1 and PWM2 may be out of phase with respect to each other in sequence by an angle between 150 degrees and 210 degrees. For example but not exclusively, the control signals PWM1 and PWM2 may be pulse width modulation signals. In the power conversion circuit X1, the first switch M11 is controlled by the control signal PWM1, and the control signal of the first switch M12 and the control signal PWM1 have the same duty ratio and are 180 degrees out of phase with respect to each other. The control signal of the second switch M13 is complementary to the control signal PWM1, and the control signal of the second switch M14 is complementary to the control signal of the first switch M12. In the power conversion circuit X2, the first switch M21 is controlled by the control signal PWM2, and the control signal of the first switch M22 and the control signal PWM2 have the same duty ratio and are 180 degrees out of phase with respect to each other. The control signal of the second switch M23 is complementary to the control signal PWM2, and the control signal of the second switch M24 is complementary to the control signal of the first switch M22.

In the two power conversion circuits X1 and X2, when the duty ratio of the two control signals PWM1 and PWM2 are greater than 50%, the DC currents flowing through the inductors L11 and L12 respectively are unequal, and the DC currents flowing through the inductors L21 and L22 respectively are unequal. The two inductors L11 and L12 of the power conversion circuit X1 are a first corresponding inductor and a second corresponding inductor respectively. The two inductors L21 and L22 of the power conversion circuit X2 are a first corresponding inductor and a second corresponding inductor respectively. The DC currents flowing through the two first corresponding inductors (i.e., the inductors L11 and L21), which are corresponding to each other, are equal. The DC currents flowing through the two second corresponding inductors (i.e., the inductors L12 and L22), which are corresponding to each other, are equal. It is noted that the description about the DC currents being equal or unequal means that the DC currents are substantially equal or unequal. For example, the DC currents are equal if the difference ratio therebetween is less than or equal to 20%, and the DC currents are unequal if the difference ratio therebetween is greater than 20%. The following description about the DC currents being equal or unequal means the same. In addition, the windings of the two first corresponding inductors (i.e., the inductors L11 and L21) are wound around the magnetic component 2a of FIG. 2A, and the winding directions of the inductors L11 and L21 are the same. The windings of the two second corresponding inductors (i.e., the inductors L12 and L22) are wound around the magnetic component 2b of FIG. 2B, and the winding directions of the inductors L12 and L22 are the same. However, the actual winding directions of the inductors are not limited to that shown in the drawings.

As shown in FIG. 2A, the magnetic component 2a includes two side pillars 21 and 22, two substrates 23 and 24 and a middle pillar 25. The middle pillar 25 and the side pillars 21 and 22 are located between the two substrates 23 and 24. The middle pillar 25 has an air gap 26. In this embodiment, side pillars 21, 22 and middle pillar 25 have a rectangular rail or bar shape. The winding of the inductor L11 is wound around the side pillar 21, and the winding of the inductor L21 is wound around the side pillar 22. The winding directions of the inductors L11 and L21 are the same, but not limited to that shown in the drawings. The DC magnetic flux generated by the inductor L11 on the side pillar 21 is represented by $\Phi\mathbf{11}$. The DC magnetic flux $\Phi\mathbf{11}$ may flow toward the side pillar 22 and the middle pillar 25. The part of the DC magnetic flux $\Phi\mathbf{11}$ flowing toward the side pillar 22 is represented by $\Phi(\mathbf{11\text{-}1})$, and the part of the DC magnetic flux $\Phi\mathbf{11}$ flowing toward the middle pillar 25 is represented by $\Phi(\mathbf{11\text{-}2})$. The DC magnetic flux generated by the inductor L21 on the side pillar 22 is represented by $\Phi\mathbf{21}$. The DC magnetic flux $\Phi\mathbf{21}$ may flow toward the side pillar 21 and the middle pillar 25. The part of the DC magnetic flux Φ21 flowing toward the side pillar 21 is represented by Φ(21-1), and the part of the DC magnetic flux Φ21 flowing toward the middle pillar 25 is represented by Φ(21-2). Since the middle pillar 25 has an air gap 26, the equivalent reluctance of the middle pillar 25 is large, which causes the DC magnetic flux flowing toward the middle pillar 25 to be smaller.

According to Ohm's law for magnetic circuits, Φ11=Nt*I11/Rm1, and Φ(21-1)=Nt*I21/Rm1. Nt is the winding turns of the inductors L11 and L21 (as an example, the inductors L11 and L21 have the same winding turns). I11 is the DC current flowing through the inductor L11. I21 is the DC current flowing through the inductor L21. Rm1 is the equivalent reluctance of the side pillars 21 and 22 (as an example, the side pillars 21 and 22 have the same equivalent reluctance). Therefore, the DC magnetic flux on the side pillar 21 equals Φ11−Φ(21-1)=Nt*(I11−I21)/Rm1. Since the DC currents flowing through the inductors L11 and L21 are equal, i.e., I11=I21, Φ11 is equal to Φ(21-1), the DC magnetic fluxes on the side pillar 21 are therefore counteracted by each other. Consequently, it is allowed to employ small reluctance Rm1, namely, there is no need to form air gap on the side pillar 21, which can increase the inductance of the inductor L11 and reduces the output current ripple and loss of the power conversion device 100.

It is noted that the counteraction of the magnetic flux does not mean that the magnetic flux is zero. For example, there may be a residual magnetic flux after counteracting magnetic flux, and the amount of the residual magnetic flux is determined by the difference between the currents flowing through the corresponding inductors. The flowing description about the counteraction of magnetic flux means the same.

Similar to the magnetic fluxes on the side pillar 21, the magnetic fluxes on the side pillar 22 are counteracted by each other without forming air gap on the side pillar 22. Therefore, the inductance of the inductor L21 can be increased, and the output current ripple and loss of the power conversion device 100 can be reduced. Also, the DC magnetic fluxes on the substrates are counteracted by each other. Consequently, the thickness of the substrates 23 and 24 can be decreased. As a result, the size of the magnetic component 2a can be reduced.

In an embodiment, through the control signals PWM1 and PWM2 being out of phase with respect to each other, the voltage signals on the inductors L11 and L21 may be out of phase with respect to each other by an angle between 150 degrees and 210 degrees (for example but not limited to 180 degrees). Consequently, the AC magnetic fluxes on the middle pillar 25 of the magnetic component 2a are counteracted by each other, which can increase the equivalent inductances of the inductors L11 and L21 and reduce the ripple of the output current.

For the same reason, in FIG. 2B, the windings of the inductors L12 and L22 are wound around the side pillars 21 and 22 of the magnetic component 2b respectively. The counteraction of DC magnetic flux is achieved on the side pillars 21 and 22 of the magnetic component 2b. The elements of the magnetic component 2b which are similar to that of the magnetic component 2a are designated by identical numeral references, the counteraction principle for the magnetic component 2b is the same as that for the magnetic component 2a, and thus the detailed descriptions thereof are omitted herein. In an embodiment, through the control signals PWM1 and PWM2 being out of phase with respect to each other, the voltage signals on the inductors L12 and L22 may be out of phase with respect to each other by an angle between 150 degrees and 210 degrees (for example but not limited to 180 degrees). Consequently, the AC magnetic fluxes on the middle pillar 25 of the magnetic component 2b are counteracted by each other, which can increase the equivalent inductances of the inductors L12 and L22 and reduce the ripple of the output current.

Figure 3A:
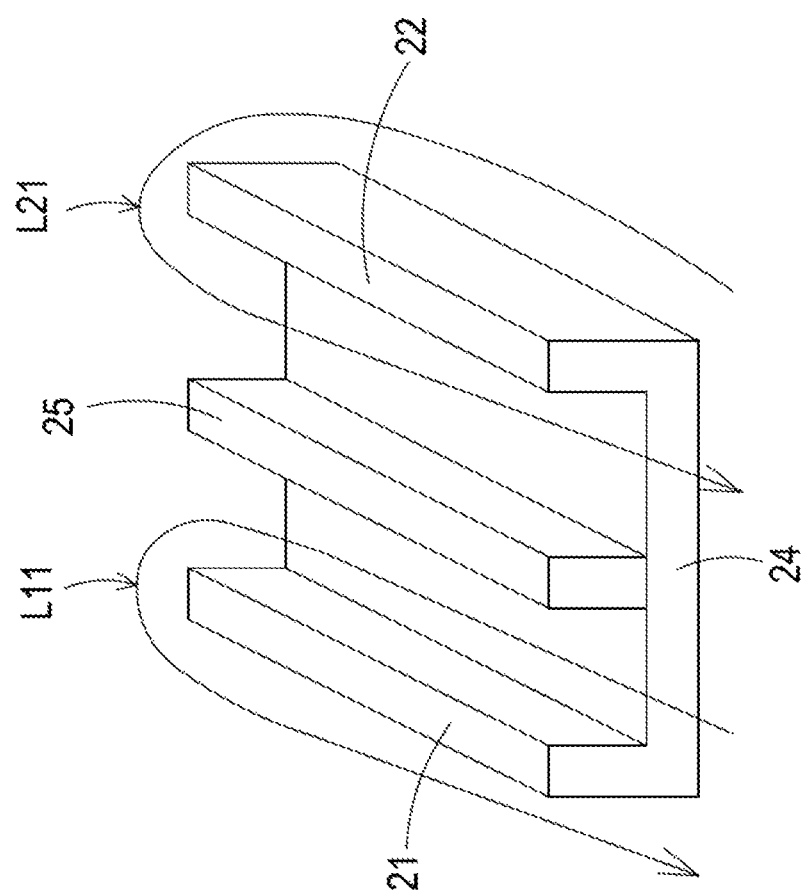
FIG. 3A and FIG. 3B are schematic views showing the winding manner of inductors in the first embodiment of the present disclosure.
Figure 3B:
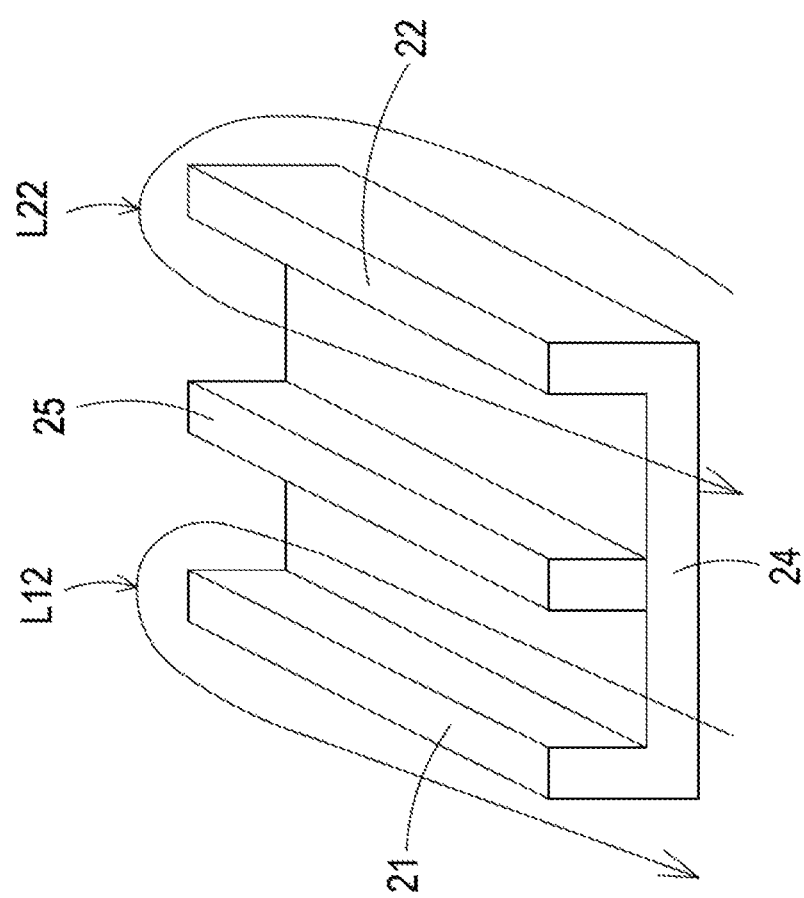

FIG. 3A illustrates a winding manner of the inductors L11 and L21 in accordance with an embodiment of the present disclosure. FIG. 3B illustrates the winding manner of the inductors L12 and L22 in accordance with an embodiment of the present disclosure. As shown in FIGS. 3A and 3B, the preconditions are winding the windings of the corresponding inductors (e.g., L12 and L22) on different side pillars of the same magnetic component, thereby allowing the DC magnetic fluxes on the side pillars to be counteracted by each other without forming air gap on the side pillar. It is to be appreciated that, so long as the preconditions are satisfied, the winding position of the inductors, the entire structure of the magnetic components 2a and 2b and the shape and size of the side and middle pillars of the magnetic components 2a and 2b can be adjusted according to actual requirements without being limited to the exemplified manner as shown in the drawings.

For example but not exclusively, the magnetic component (2a, 2b) can be formed by two magnetic cores assembled together. In an embodiment, one magnetic core may have a first substrate, the middle pillar 25 and the side pillars 21 and 22 formed on the first substrate, while the other magnetic core may have a second substrate without any pillars. In another embodiment, one magnetic core may have a first substrate, a part of the middle pillar 25 and a part of the side pillars 21 and 22 formed on the first substrate, while the other magnetic core may have a second substrate, the other part of the middle pillar 25 and the other part of the side pillars 21 and 22 formed on the second substrate.

Figure 4:
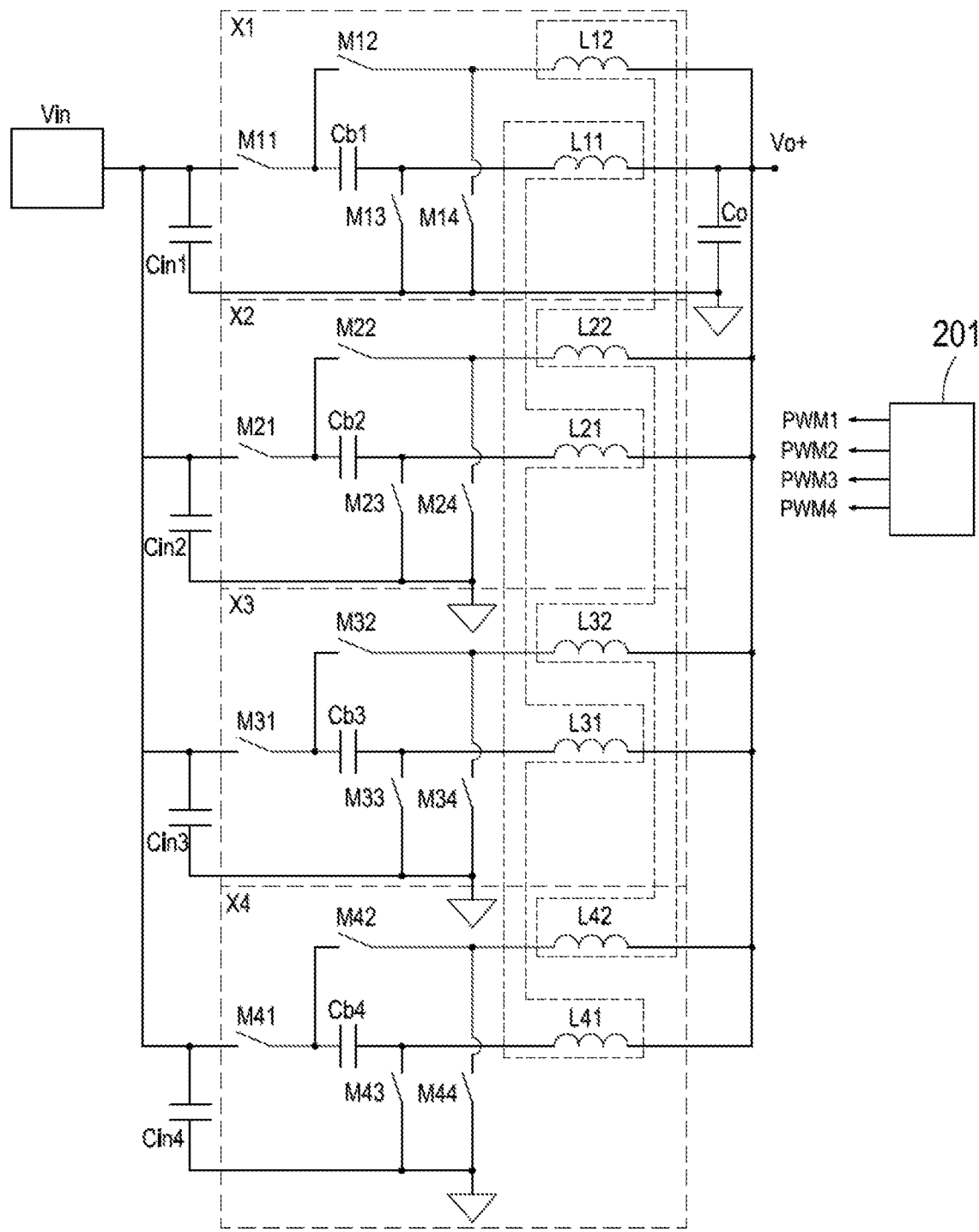
FIG. 4 is a schematic circuit diagram illustrating a power conversion device according to a second embodiment of the present disclosure.
Figure 5A:
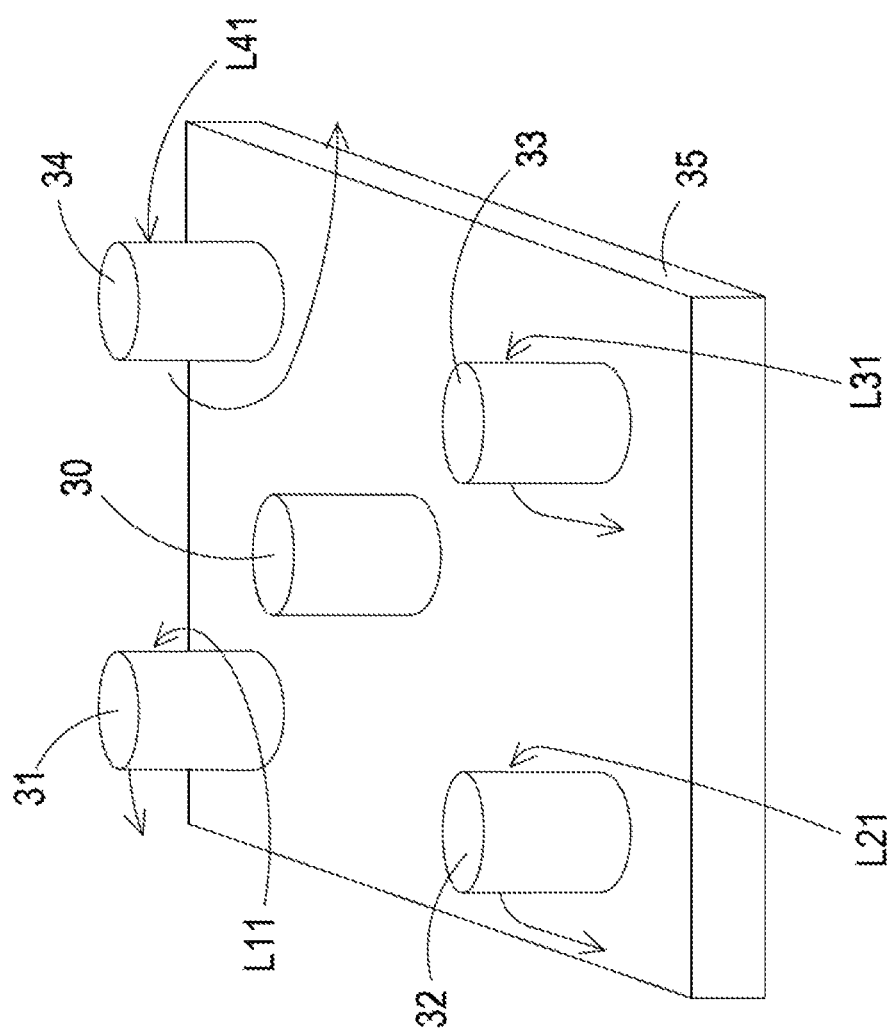
FIG. 5A and FIG. 5B are schematic views showing the structure of a magnetic component in the second embodiment of the present disclosure.
Figure 5B:
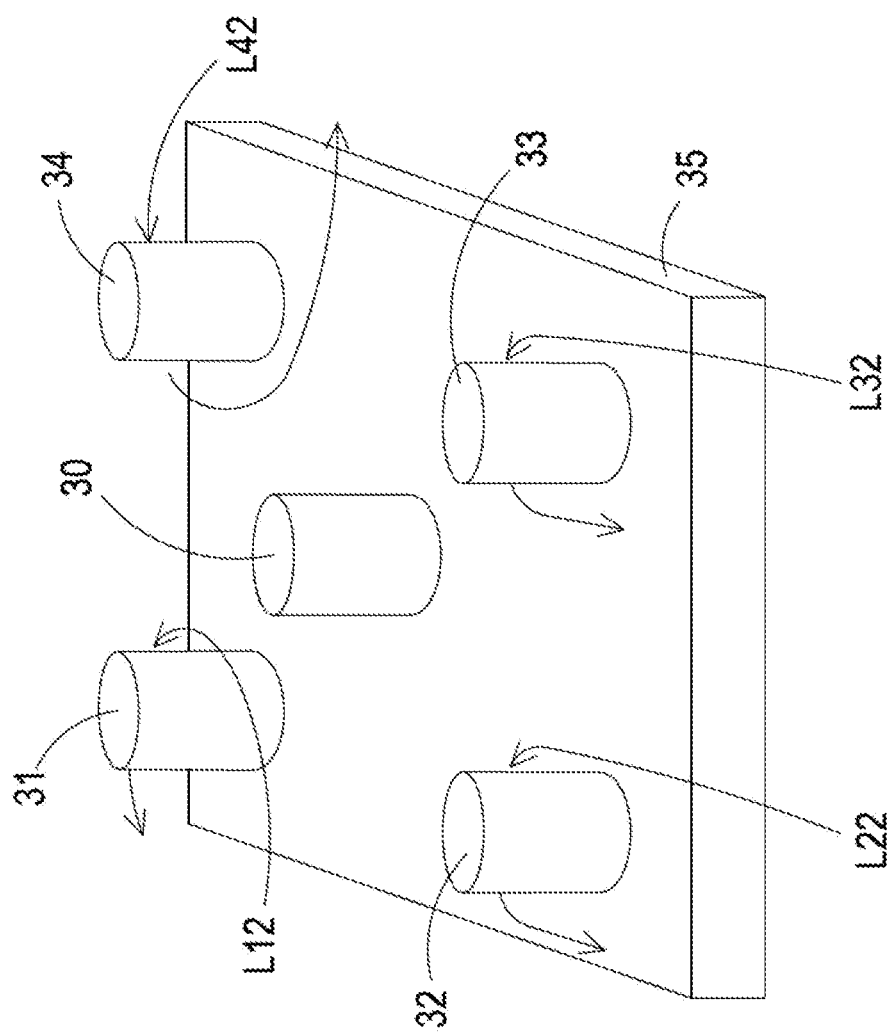

FIG. 4 is a schematic circuit diagram illustrating a power conversion device 200 according to a second embodiment of the present disclosure. FIG. 5A and FIG. 5B are schematic views showing the structure of a magnetic component in the second embodiment of the present disclosure. In accordance with the second embodiment shown in FIG. 4, FIG. 5A and FIG. 5B, the actual implementation with N equal to 4 and M equal to 2 is exemplified as follows. Compared with the first embodiment, the second embodiment can further increase the load capacity of the power conversion device.

In the second embodiment shown in FIG. 4, the power conversion device 200 includes four power conversion circuits X1, X2, X3 and X4. In this embodiment, the power conversion circuit X1 is connected to the input capacitor Cin1 in parallel; the power conversion circuit X2 is connected to the input capacitor Cin2 in parallel; the power conversion circuit X3 is connected to the input capacitor Cin3 in parallel; and the power conversion circuit X4 is connected to the input capacitor Cin4 in parallel, but not exclusively. In another embodiment, the power conversion circuits X1, X2, X3 and X4 may be connected to the same input capacitor in parallel. The output port Vo of the power conversion device 200 is formed by connecting the output capacitor Co to the output terminals of the power conversion circuits X1, X2, X3 and X4 in parallel.

The components of the power conversion circuits X1 and X2 in the second embodiment are the same as that in the first embodiment, thus the detailed descriptions thereof are omitted herein. The power conversion circuit X3 includes two power conversion units. The first power conversion unit of the power conversion circuit X3 includes a first switch M31, a second switch M33 and an inductor L31. The second power conversion unit of the power conversion circuit X3 includes a first switch M32, a second switch M34 and an inductor L32. The power conversion circuit X4 includes two power conversion units. The first power conversion unit of the power conversion circuit X4 includes a first switch M41, a second switch M43 and an inductor L41. The second power conversion unit of the power conversion circuit X4 includes a first switch M42, a second switch M44 and an inductor L42.

The controller 201 output four control signals PWM1, PWM2, PWM3 and PWM4 to control the four power conversion circuits X1, X2, X3 and X4 respectively. The control signals PWM1, PWM2, PWM3 and PWM4 have the same duty ratio. The control signals PWM1, PWM2, PWM3 and PWM4 may be at the same phase, or the control signals PWM1, PWM2, PWM3 and PWM4 may be out of phase with respect to each other in sequence by an angle between 60 degrees and 120 degrees. For example but not exclusively, the control signals PWM1, PWM2, PWM3 and PWM4 are pulse width modulation signals.

The control manner for the power conversion circuits X1 and X2 in the second embodiment is the same as that in the first embodiment, and the detailed descriptions thereof are omitted herein. In the power conversion circuit X3, the first switch M31 is controlled by the control signal PWM3, and the control signal of the first switch M32 and the control signal PWM3 have the same duty ratio and are 180 degrees out of phase with respect to each other. The control signal of the second switch M33 is complementary to the control signal PWM3, and the control signal of the second switch M34 is complementary to the control signal of the first switch M32. In the power conversion circuit X4, the first switch M41 is controlled by the control signal PWM4, and the control signal of the first switch M42 and the control signal PWM4 have the same duty ratio and are 180 degrees out of phase with respect to each other. The control signal of the second switch M43 is complementary to the control signal PWM4, and the control signal of the second switch M44 is complementary to the control signal of the first switch M42.

In the four power conversion circuits X1, X2, X3 and X4, when the duty ratio of the four control signals PWM1, PWM2, PWM3 and PWM4 are greater than 50%, the DC currents flowing through the inductors L11 and L12 respectively are unequal, the DC currents flowing through the inductors L21 and L22 respectively are unequal, the DC currents flowing through the inductors L31 and L32 respectively are unequal, and the DC currents flowing through the inductors L41 and L42 respectively are unequal. The two inductors L11 and L12 of the power conversion circuit X1 are a first corresponding inductor and a second corresponding inductor respectively. The two inductors L21 and L22 of the power conversion circuit X2 are a first corresponding inductor and a second corresponding inductor respectively. The two inductors L31 and L32 of the power conversion circuit X3 are a first corresponding inductor and a second corresponding inductor respectively. The two inductors L41 and L42 of the power conversion circuit X4 are a first corresponding inductor and a second corresponding inductor respectively.

The DC currents flowing through the four first corresponding inductors (i.e., the inductors L11, L21, L31 and L41), which are corresponding to each other, are equal. The DC currents flowing through the four second corresponding inductors (i.e., the inductors L12, L22, L32 and L42), which are corresponding to each other, are equal. In addition, the windings of the four first corresponding inductors (i.e., the inductors L11, L21, L31 and L41), which are corresponding to each other, are wound around the magnetic component 3a of FIG. 5A, and the winding directions of the inductors L11, L21, L31 and L41 are the same (e.g., counterclockwise). The windings of the four second corresponding inductors (i.e., the inductors L12, L22, L32 and L42), which are corresponding to each other, are wound around the magnetic component 3b of FIG. 5B, and the winding directions of the inductors L12, L22, L32 and L42 are the same (e.g., counterclockwise). However, the actual winding directions of the inductors are not limited to that shown in the drawings.

FIG. 5A and FIG. 5B show the partial structures of the magnetic components 3a and 3b respectively.

As shown in FIG. 5A, the magnetic component 3a includes a middle pillar 30, four side pillars 31, 32, 33 and 34, and two substrates (only one substrate 35 is shown in FIG. 5A). The middle pillar 30 and the four side pillars 31, 32, 33 and 34 are located between the two substrates. In this embodiment, the middle pillar 30 and side pillars 31, 32, 33, 34 have a cylindrical shape. It is appreciated that middle pillar 30 and side pillars 31, 32, 33, 34 can have any other suitable shapes, such as, a triangular prism shape, a rectangular prism shape, a hexagonal prism shape, etc. The four side pillars 31, 32, 33 and 34 are disposed around the middle pillar 30. The middle pillar 30 has an air gap (not shown). The windings of the inductor L11, L21, L31 and L41 are wound around the side pillars 31, 32, 33 and 34. The winding directions of the inductors L11, L21, L31 and L41 are the same (e.g., counterclockwise), but not limited to that shown in the drawings. Accordingly, the counteraction of DC magnetic flux is achieved on the four side pillars 31, 32, 33 and 34, the counteraction principle can be derived from the first embodiment, and the detailed descriptions thereof are thus omitted herein.

In an embodiment, through the control signals PWM1, PWM2, PWM3 and PWM4 being out of phase with respect to each other, the voltage signals on the inductors L11, L21, L31 and L41 may be out of phase with respect to each other by an angle between 60 degrees and 120 degrees (for example but not limited to 90 degrees). Consequently, the AC magnetic fluxes on the middle pillar 30 are counteracted by each other, which can increase the equivalent inductances of the inductors L11, L21, L31 and L41 and reduce the ripple of the output current.

For the same reason, in FIG. 5B, the windings of the inductors L12, L22, L32 and L42 are wound around the side pillars 31, 32, 33 and 34 of the magnetic component 3b with the same winding direction (e.g., counterclockwise). The counteraction of DC magnetic flux is achieved on the side pillars 31, 32, 33 and 34 of the magnetic component 3b. The elements of the magnetic component 3b which are similar to that of the magnetic component 3a are designated by identical numeral references, the counteraction principle for the magnetic component 3b is the same as that for the magnetic component 3a, and thus the detailed descriptions thereof are omitted herein. In an embodiment, through the control signals PWM1, PWM2, PWM3 and PWM4 being out of phase with respect to each other, the voltage signals on the inductors L12, L22, L32 and L42 may be out of phase with respect to each other by an angle between 60 degrees and 120 degrees (for example but not limited to 90 degrees). Consequently, the AC magnetic fluxes on the middle pillar 30 are counteracted by each other, which can increase the equivalent inductances of the inductors L12, L22, L32 and L42 and reduce the ripple of the output current.

From the above descriptions, the present disclosure provides a power conversion device. In a plurality of power conversion circuits, the DC currents respectively flowing through the corresponding inductors are equal. The windings of these corresponding inductors are wound around the side pillars of the same magnetic component, thus the DC magnetic fluxes on the side pillars can be counteracted by each other without forming an air gap on the side pillars. Consequently, the loss of the power conversion device is reduced, and the magnetic core is prevented from being saturated easily. Moreover, the DC magnetic fluxes on the substrates are counteracted by each other. Therefore, the thickness of the substrates can be decreased, and the size of the magnetic component can be reduced.

While the present disclosure has been described in terms of what is presently considered to be the most practical and preferred embodiments, it is to be understood that the claimed scope of the present disclosure needs not be limited to the disclosed embodiments.

What is claimed is:

1. A power conversion device, comprising:
    an input port and an output port;
    N power conversion circuits electrically connected between the input and output ports in parallel, each of the N power conversion circuits comprising M inductors with unequal DC currents respectively flowing through the M inductors in each of the N power conversion circuits, each one of the M inductors in different ones of the N power conversion circuits corresponding to each other to form a group of N corresponding inductors with equal DC currents respectively flowing through the N corresponding inductors, wherein N and M are positive integers greater than 1; and
    M magnetic components, each of the M magnetic components comprising a middle pillar, N side pillars and two substrates, the middle pillar and the N side pillars being located between the two substrates, the middle pillar having an air gap, wherein in the N power conversion circuits, windings of the N corresponding inductors are respectively wound around the N side pillars of each of the M magnetic components.

2. The power conversion device according to claim 1, wherein in the N power conversion circuits, voltage signals on the N corresponding inductors which are wound around the same magnetic component are out of phase with respect to each other by an angle between (360/N−30) degrees and (360/N+30) degrees.

3. The power conversion device according to claim 1, wherein each of the N power conversion circuit comprises M power conversion units, each of the M power conversion units comprises a first switch, a second switch serially coupled to the first switch, and one of the M inductors, the first switch of the first power conversion unit is connected to the input port, and the first switch of another power conversion unit is connected to the first switch of a preceding one of the power conversion units in sequence.

4. The power conversion device according to claim 3, further comprising a controller, wherein the controller outputs N control signals to control the N power conversion circuits, the N control signals having the same duty ratio.

5. The power conversion device according to claim 4, wherein the N control signals are configured to control the first and second switches of the power conversion units of the N power conversion circuits respectively, wherein in each of the N power conversion circuits, the control signals of the M first switches of the M power conversion units have the same duty ratio and are 360/M degrees out of phase with respect to each other in sequence, and control signals of the first and second switches are complementary to each other.

6. The power conversion device according to claim 4, wherein the N control signals are at the same phase.

7. The power conversion device according to claim 4, wherein the N control signals are out of phase with respect to each other in sequence by an angle between (360/N−30) degrees and (360/N+30) degrees.

8. The power conversion device according to claim 4, wherein the duty ratio of the N control signals is larger than 50%.

9. The power conversion device according to claim 1, wherein each of the M magnetic components is formed by two magnetic cores assembled together.

10. The power conversion device according to claim 9, wherein one of the two magnetic cores has one of the two substrates, the middle pillar and the N side pillars, and wherein the other one of the two magnetic cores has the other one of the two substrates, the middle pillar having an air gap.

11. The power conversion device according to claim 9, wherein one of the two magnetic cores has one of the two substrates, a part of the middle pillar and a part of the N side pillars, and wherein the other one of the two magnetic cores has the other one of the two substrates, the other part of the middle pillar and the other part of the N side pillars, at least a part of the middle pillar having an air gap.

12. The power conversion device according to claim 1, wherein in each of the M magnetic components, DC magnetic fluxes are generated by the N corresponding inductors wound around the N side pillars, the DC magnetic fluxes are superimposed on the middle pillar, and the DC magnetic fluxes on each of the N side pillars are counteracted by each other.

13. The power conversion device according to claim 1, wherein, in the N power conversion circuits, windings of the N corresponding inductors are respectively wound around the N side pillars of each of the M magnetic components with the same winding direction.

14. A power converter, comprising:
    an input port and an output port;
    a first quantity of power conversion circuits electrically wired in parallel between the input and output ports; and
    a second quantity of magnetic components, each of the magnetic components having at least a first substrate, a first central pillar on the first substrate, and the first quantity of first side pillars on the first substrate;
    wherein each of the power conversion circuits comprises a third quantity of inductors, each of the inductors being magnetically coupled to a respective one of the first side pillars of a respective one of the magnetic components; and
    wherein DC currents respectively flowing through the inductors in each of the power conversion circuits are not equal and wherein DC currents respectively flowing through the inductors magnetically coupled to a same one of the magnetic components are equal.

15. The power converter device of claim 14, wherein each of the magnetic components further comprises a second substrate disposed on the first substrate, such that the first central pillar forms an air gap between the first and second substrates and that the second substrate contacts the first side pillars without forming an air gap.

16. The power converter of claim 14, wherein each of the magnetic components further comprises a second substrate, a second central pillar on the second substrate, and the first quantity of second side pillars on the second substrate, and wherein the second substrate is disposed on the first substrate, such that the first and second central pillars form an air gap between the first and second substrates, and that the first side pillars contact the second side pillars without forming an air gap.

17. The power converter of claim 14, wherein the first central pillar includes an air gap.

18. The power converter of claim 14, wherein the first central pillar has one of a rectangular rail shape, a cylindrical shape, a triangular prism shape, a rectangular prism shape, and a hexagonal prism shape.

19. The power converter of claim 14, wherein each of the first side pillars has one of a rectangular rail shape, a cylindrical shape, a triangular prism shape, a rectangular prism shape, and a hexagonal prism shape.

20. The power converter of claim 14, wherein, in each of the magnetic components, DC magnetic fluxes generated by the inductors are superimposed in the first central pillar and are counteracted with each other in each of the first side pillars.

21. The power converter of claim 14, wherein the third quantity is equal to the second quantity.

* * * * *